United States Patent
Zimmermann (10) Patent No.: US 6,788,350 B2
(45) Date of Patent: Sep. 7, 2004

(54) APPARATUS AND METHOD FOR IMPLEMENTING A UNIFIED CLOCK RECOVERY SYSTEM

(75) Inventor: Klaus Zimmermann, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 489 days.

(21) Appl. No.: 10/036,791

(22) Filed: Nov. 1, 2001

(65) Prior Publication Data

US 2003/0081147 A1  May 1, 2003

(51) Int. Cl.[7] .............................................. H04N 9/475
(52) U.S. Cl. ........................ 348/512; 348/537; 375/371
(58) Field of Search ................................. 348/500, 510, 348/512, 536, 537, 554, 423.1, 497; 375/371, 355, 377, 354; 370/358, 359, 354; H04N 9/475

(56) References Cited

U.S. PATENT DOCUMENTS

| | | | | |
|---|---|---|---|---|
| 5,361,277 A | * | 11/1994 | Grover ........................ | 375/356 |
| 5,420,856 A | * | 5/1995 | Kerns ......................... | 370/359 |
| 5,440,591 A | * | 8/1995 | Liron et al. .................. | 375/354 |
| 5,550,860 A | * | 8/1996 | Georgiou et al. ............ | 375/220 |
| 5,592,508 A | * | 1/1997 | Cooper ........................ | 375/216 |
| 5,926,228 A | * | 7/1999 | Jeon et al. ................... | 348/554 |
| 5,946,049 A | * | 8/1999 | Cooper et al. .............. | 348/513 |
| 6,240,132 B1 | * | 5/2001 | Yedid ......................... | 375/232 |

OTHER PUBLICATIONS

"Information Technology"—Generic Coding Of Moving Pictures And Associated Audio: Systems, Recommendation H.222.0, ISO/IEC 13818–1.

* cited by examiner

*Primary Examiner*—Michael H. Lee
(74) *Attorney, Agent, or Firm*—Gregory J. Koerner; Simon & Koerner LLP (57) ABSTRACT

An apparatus and method for effectively implementing a unified clock-recovery system includes an analog frontend module that is configured to generate an analog-source timing reference signal that is based upon analog-source data. Similarly, a digital frontend module may extract a digital-source timing reference signal based upon digital-source data. A switch module may then select between the analog-source timing reference signal and the digital-source timing reference signal to thereby provide a selected input timing reference signal to a unified backend clock recovery module. The backend clock recovery module may then compare the selected input timing reference signal with an output timing reference signal in order to generate a timing error for advantageously adjusting a local clock to thereby compensate for the foregoing timing error.

43 Claims, 9 Drawing Sheets

APPARATUS AND METHOD FOR IMPLEMENTING A UNIFIED CLOCK RECOVERY SYSTEM

BACKGROUND SECTION

1. Field of the Invention

This invention relates generally to techniques for managing electronic information, and relates more particularly to an apparatus and method for effectively implementing a unified clock-recovery system.

2. Description of the Background Art

Implementing effective methods for managing electronic information is a significant consideration for designers and manufacturers of contemporary electronic devices. However, effectively managing information utilized by electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, stores, displays, and manipulates digital image data may benefit from an efficient implementation because of the large amount and complexity of the digital data involved.

Due to growing demands on system resources and substantially increasing data magnitudes, it is apparent that developing new techniques for managing information is a matter of concern for related electronic technologies. Therefore, for all the foregoing reasons, developing effective systems for managing electronic information remains a significant consideration for designers, manufacturers, and users of contemporary electronic devices.

SUMMARY

In accordance with the present invention, an apparatus and method for effectively implementing a unified clock-recovery system are disclosed. In one embodiment, initially, an analog video signal (such as an NTSC or PAL analog video signal) may be provided from an analog transmitter to an analog-to-digital converter (ADC) in a receiver device. The ADC may responsively convert the analog video signal into a converted digital signal that preferably retains timing relationships from the analog video signal. The ADC may then preferably provide the converted digital signal to a frontend module in the receiver device.

A timestamp generator in the analog frontend module may then preferably generate a series of analog-source timestamps corresponding to the converted digital signal received from the ADC. The timestamp generator may repeatedly generate individual timestamps after a pre-defined acquisition unit of the converted digital signal has been received, starting with the beginning of an arbitrary line of video information in the converted digital signal. In certain embodiments, the timestamp generator may preferably utilize an acquisition unit that is equal to one video frame. However, in alternate embodiments, any other appropriate acquisition unit may be utilized.

A timestamp processor from the analog frontend module may then preferably extract the analog-source timestamps and store them into a local memory along with pointers to corresponding analog-source data. In certain embodiments, the timestamp processor may also perform various procedures with the analog-source timestamps to provide a processed output from the analog frontend module through a switch module to a backend clock recovery module in the receiver device. For example, in certain embodiments, the timestamp processor may utilize the analog-source timestamps to calculate a input timing reference signal for use by the backend clock recovery module.

In addition, a digital video bitstream may similarly be provided from a digital transmitter to a digital frontend module of the receiver device. The foregoing digital bitstream may preferably include a series of digital-source timestamps with timing information that corresponds to the digital bitstream. A timestamp processor from the digital frontend module may then preferably extract the digital-source timestamps, and store them into the local memory along with pointers to corresponding digital-source data.

In certain embodiments, the timestamp processor may also perform various procedures with the digital-source timestamps to provide a processed output from the digital frontend module through the switch module to the backend clock recovery module. For example, in certain embodiments, the timestamp processor may utilize the digital-source timestamps to calculate an input timing reference signal for use by the backend clock recovery module.

The switch module may preferably be controlled to select between either a processed output of the analog frontend module, or a processed output of the digital frontend module. In certain embodiments, the switch module may preferably be controlled in response to an input signal selection made by a system user of the receiver device. The switch module may thus responsively provide the processed output of either the analog frontend module or the digital frontend module to the backend clock recovery module as an input timing reference signal.

In accordance with the present invention, the backend clock recovery module may selectively utilize the processed output of either the analog frontend module or the digital frontend module to control a voltage-controlled clock oscillator to thereby generate a local clock. In certain embodiments, the backend clock recovery module may preferably generate a series of output timestamps corresponding to video data that is output from the receiver device. The backend clock recovery module may then calculate an input timing difference value by subtracting two sequential analog-source timestamps or digital-source timestamps to thereby define the input timing of a corresponding acquisition unit.

The backend clock recovery module may similarly calculate an output timing difference value by subtracting two appropriate sequential output timestamps to thereby define the output timing of that same corresponding acquisition unit. The backend clock recovery module may then subtract the foregoing input timing difference value from the corresponding output timing difference value to produce a timing error for adjusting the voltage-controlled clock oscillator to thereby optimize timing of the local clock of the receiver device. The present invention thus provides an improved apparatus and method for effectively implementing a unified clock-recovery system.

DETAILED DESCRIPTION

The present invention relates to an improvement in clock recovery techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises an apparatus and method for effectively implementing a unified clock-recovery system, and preferably includes an analog frontend module that may be configured to generate an analog-source timing reference signal that is based upon analog-source data. Similarly, a digital frontend module may extract a digital-source timing reference signal based upon digital-source data.

A switch module may then select between the analog-source timing reference signal and the digital-source timing reference signal to thereby provide a selected input timing reference signal to a unified backend clock recovery module. The backend clock recovery module may then compare the selected input timing reference signal with an output timing reference signal in order to generate a timing error for advantageously adjusting a local clock to thereby compensate for the foregoing timing error.

Figure 1:
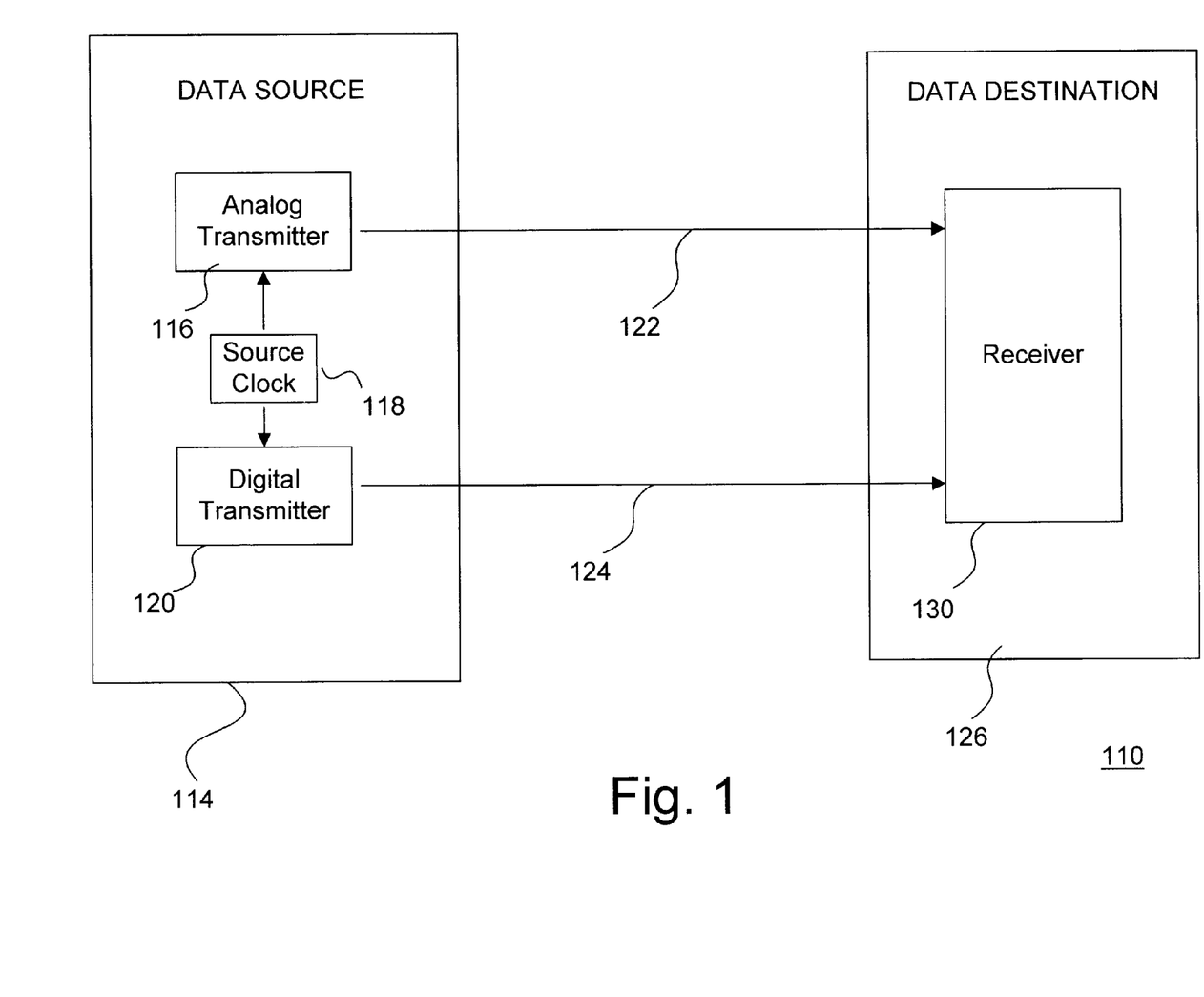
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, a data source 114, an analog transmitter 116, a source clock 118, a digital transmitter 120, a data destination 126, and a receiver 130. In alternate embodiments, electronic system 110 may readily be implemented using various components and configurations in addition to, or instead of, those discussed in conjunction with the FIG. 1 embodiment. For example, analog transmitter 116 and digital transmitter 120 may reside on separate data sources. In addition, analog transmitter 116 and digital transmitter 120 may each be coupled to a separate source clock. Further, system 110 may also readily include multiple analog sources or multiple digital sources.

In the FIG. 1 embodiment, data source 114 may be implemented as any desired type of electronic entity or system. For example, data source 114 may include a computer device, a video storage device, one or more video cameras, a compact disc (CD) player, or a video broadcasting transmission system. In the FIG. 1 embodiment, analog transmitter 116 and digital transmitter 120 may be implemented in any effective manner to transmit appropriate data from data source 114.

In the FIG. 1 embodiment, analog transmitter 116 may preferably transmit an analog video signal from data source 114 via path 122 in accordance with any appropriate analog standard. For example, analog transmitter 116 may transmit a video signal from data source 114 in accordance with a National Television Standards Committee (NTSC) standard. Furthermore, in the FIG. 1 embodiment, digital transmitter 120 may preferably transmit a multiplexed bitstream (including a video bitstream) from data source 114 via path 124 in accordance with any appropriate standard. For example, digital transmitter 120 may transmit a multiplexed bitstream (including a video bitstream) from data source 114 in accordance with a Motion Picture Experts Group standard. In certain other embodiments, analog transmitter 116 and digital transmitter 120 may alternately transmit other types of information from various other information sources in accordance with any other appropriate format or standard. For example, although the present invention is discussed in the context of analog and digital video data, the principles disclosed herein may readily be applied to non-video data in any format, especially wherein the data is transmitted at a certain clock frequency which must be recovered at the receiver 130.

In the FIG. 1 embodiment, data destination 126 may be implemented as any desired type of electronic entity or system. For example, data destination 126 may include a computer device, a video display device, a digital versatile disk (DVD) decoder device, a television settop box device, or a video broadcasting receiver device. In the FIG. 1 embodiment, receiver 130 may be implemented in any effective manner to receive data from data source 114. One exemplary configuration and corresponding functionalities for receiver 130 are further discussed below in conjunction with FIG. 2.

Figure 2:
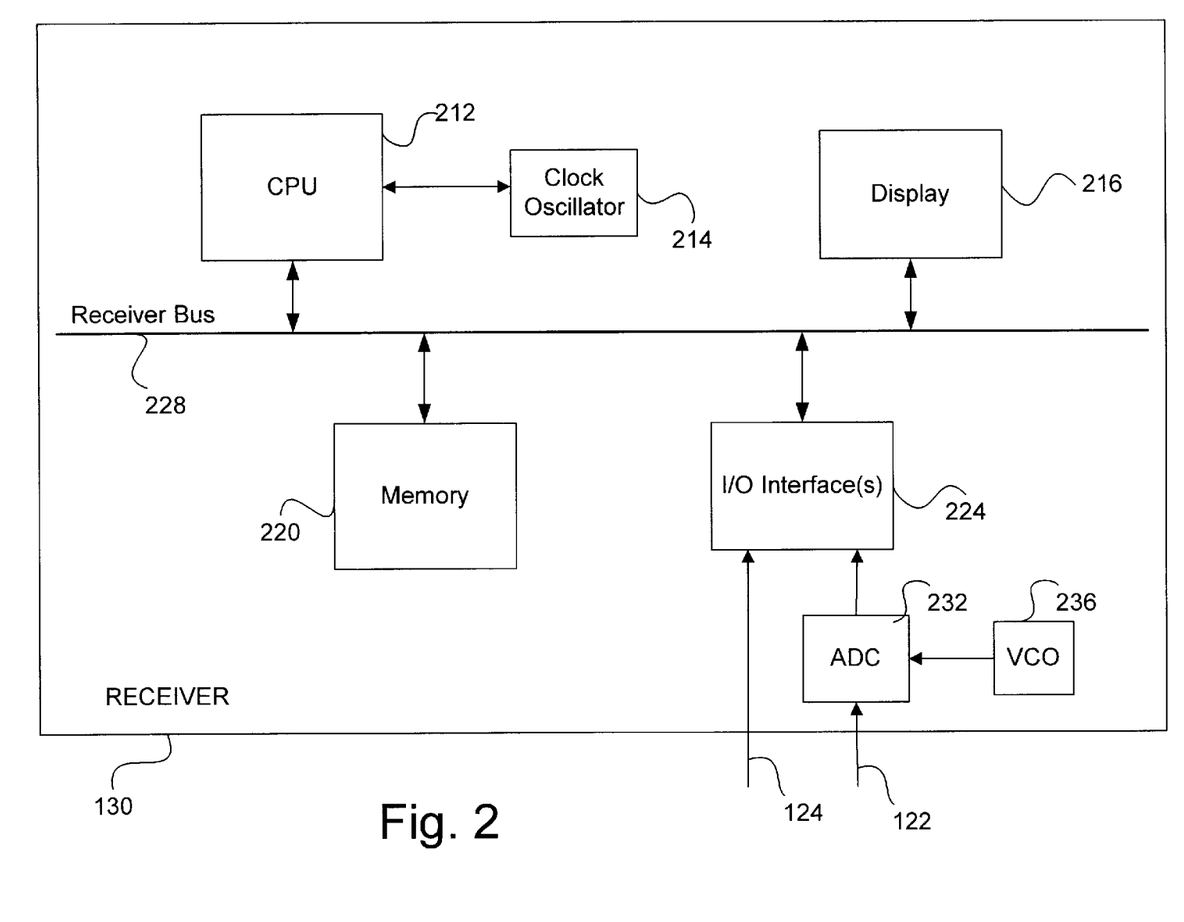
FIG. 2 is a block diagram for one embodiment of the receiver of FIG. 1, in accordance with the present invention.

Referring now to FIG. 2, a block diagram for one embodiment of the FIG. 1 receiver 130 is shown, in accordance with the present invention. In the FIG. 2 embodiment, receiver 130 preferably includes, but is not limited to, a central processing unit (CPU) 212, a voltage-controlled clock oscillator 214, a display 216, a device memory 220, one or more input/output interface(s) (I/O interface(s)) 224, an analog-to-digital converter (ADC) 232, and a voltage-controlled oscillator (VCO) 236. Selected ones of the foregoing components of receiver 130 may preferably be coupled to, and communicate through, a receiver bus 228.

In alternate embodiments, receiver 130 may readily be implemented using various components and configurations in addition to, or instead of, those discussed in conjunction with the FIG. 2 embodiment. In addition, receiver 130 may be implemented as part of any desired type of electronic system. For example, in certain embodiments, receiver 130 may be implemented as part of a video display system, a computer device, or an electronic device that supports wireless electronic communications.

In the FIG. 2 embodiment, CPU 212 may be implemented to include any appropriate and compatible microprocessor device that preferably executes software instructions to thereby control and manage the operation of receiver 130. The FIG. 2 display 216 preferably may include any effective type of display technology including a cathode-ray-tube monitor or a liquid-crystal display device. In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIGS. 3 and 4.

In the FIG. 2 embodiment, I/O interface(s) 224 may preferably include one or more input and/or output interfaces to receive and/or transmit any required types of information for receiver 130. For example, in the FIG. 2 embodiment, receiver 130 may utilize I/O interface(s) 224 to communicate with digital transmitter 120 (FIG. 1) via path 124. In addition, I/O interface(s) 224 may communicate with analog transmitter 116 (FIG. 1) through ADC 122 via path 122.

Figure 3:
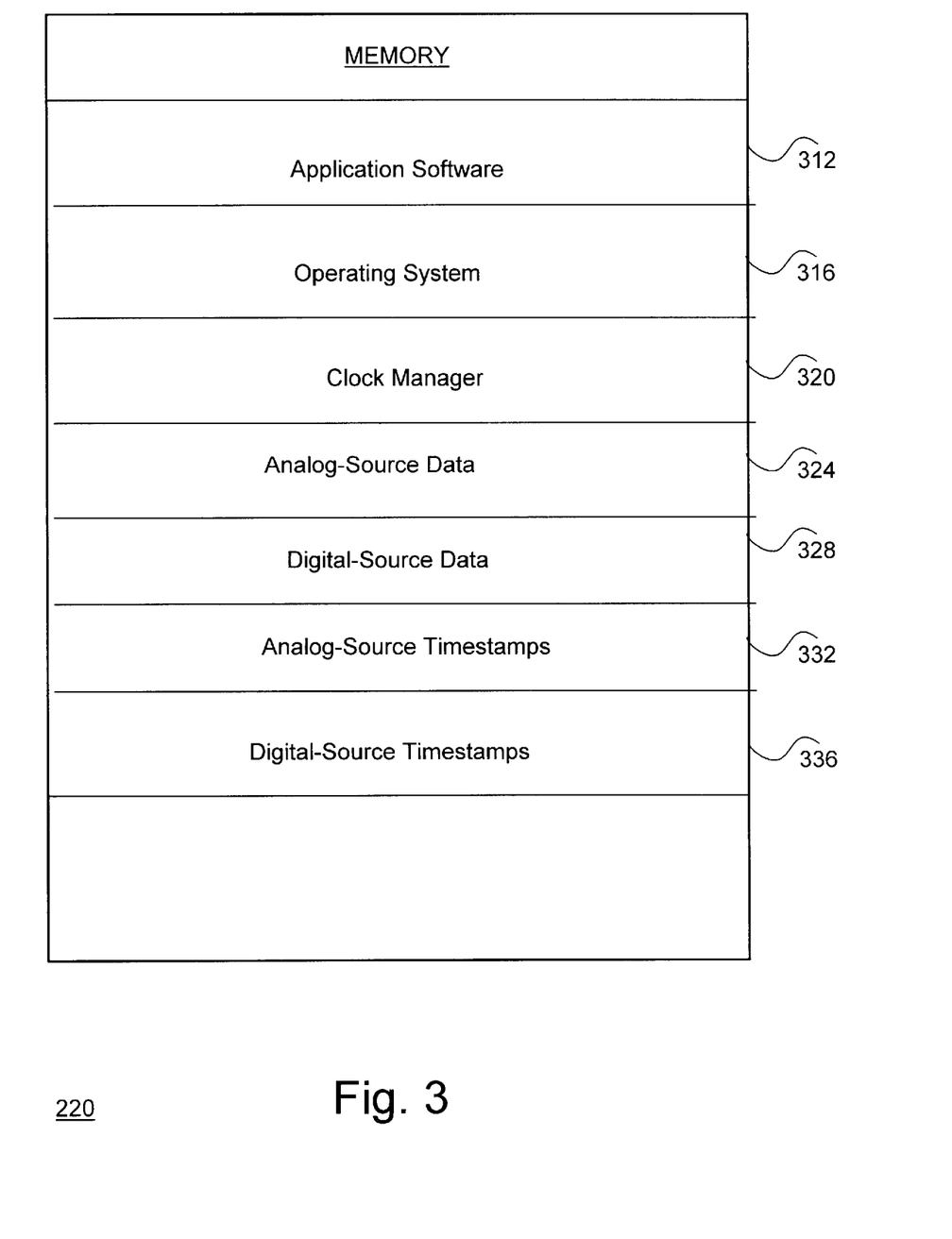
FIG. 3 is a block diagram for one embodiment of the memory of FIG. 2, in accordance with the present invention.

Referring now to FIG. 3, a block diagram for one embodiment of the FIG. 2 memory 220 is shown, in accordance with the present invention. In the FIG. 3 embodiment, memory 220 preferably includes, but is not limited to, application software 312, an operating system 316, a clock manager 320, analog-source data 324, digital-source data 328, analog-source timestamps 332, and digital-source timestamps 336. In alternate embodiments, memory 220 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for receiver 130. The particular nature and functionality of application software 312 preferably varies depending upon factors such as the specific type and particular functionality of the corresponding receiver 130. In the FIG. 3 embodiment, operating system 316 preferably controls and coordinates low-level functionality of receiver 130.

In accordance with the present invention, receiver 130 may preferably utilize clock manager 320 to advantageously perform unified clock recovery procedures to thereby compensate for various types of timing errors in either analog-source data 324 from analog transmitter 116, or in digital-source data 328 from digital transmitter 120. In alternate embodiments, clock manager 320 may readily be implemented in various types of electronic devices other than receiver 130. The implementation and utilization of clock manager 320 is further discussed below in conjunction with FIG. 4 through FIG. 9.

In the FIG. 3 embodiment, analog-source timestamps 332 may preferably include timestamps that are created from analog-source data 324. Similarly, digital-source timestamps 336 may preferably include timestamps that are extracted from digital-source data 328. In the FIG. 3 embodiment, analog-source timestamps 332 and digital-source timestamps 336 may preferably be implemented using any appropriate and effective format. The origin and utilization of analog-source timestamps 332 and digital-source timestamps 336 are further discussed below in conjunction with FIGS. 5–9.

Figure 4:
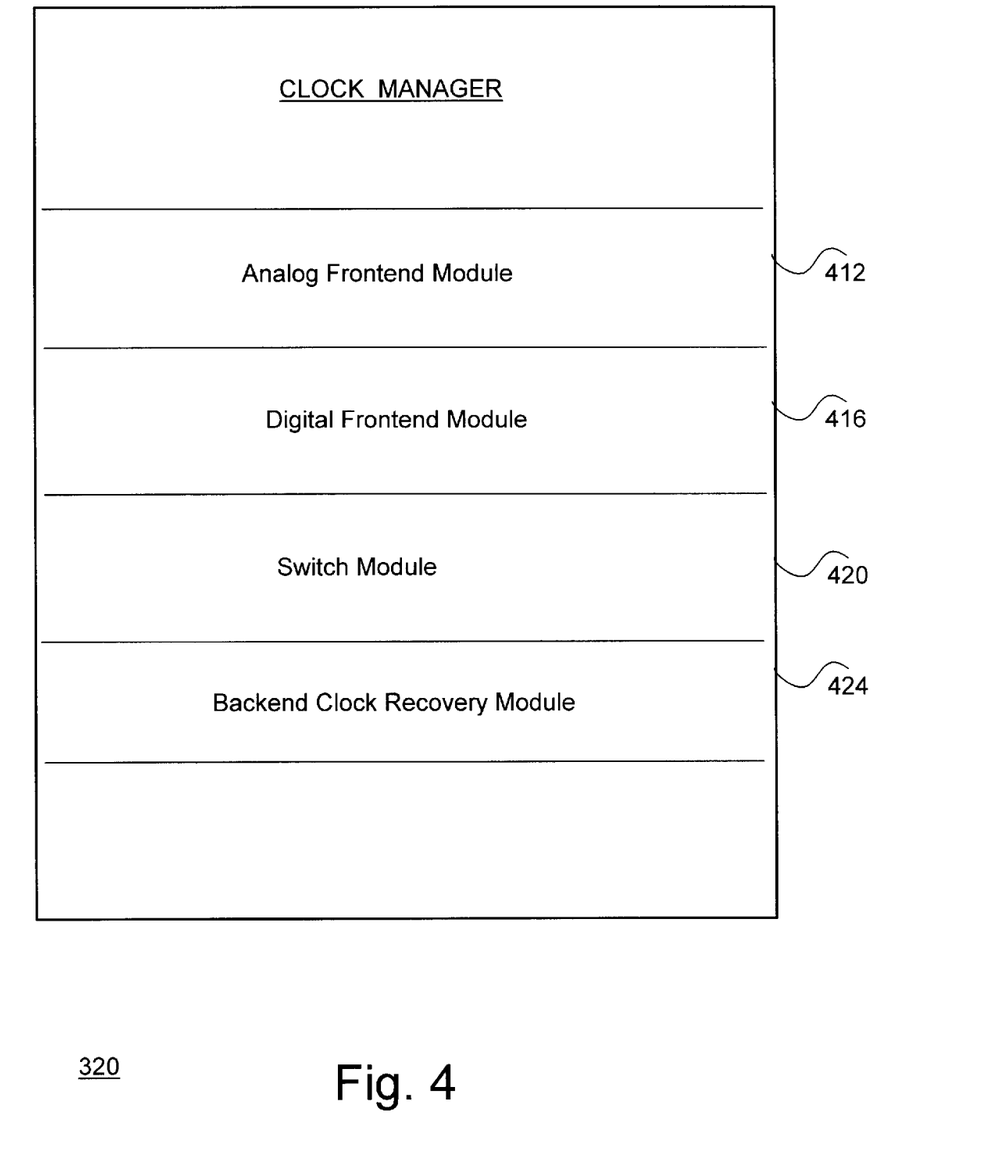
FIG. 4 is a block diagram for one embodiment of the clock manager of FIG. 3, in accordance with the present invention.

Referring now to FIG. 4, a block diagram for one embodiment of the FIG. 3 clock manager 320 is shown, in accordance with the present invention. In the FIG. 4 embodiment, clock manager 320 may include, but is not limited to, an analog frontend module 412, a digital frontend module 416, a switch module 420, and a backend clock recovery module 424. In alternate embodiments, clock manager 320 may readily include various other components in addition to, or instead of, those components discussed in conjunction with the FIG. 4 embodiment.

In the FIG. 4 embodiment, analog frontend module 412, digital frontend module 416, switch module 420, and backend clock recovery module 424 may preferably be implemented to perform portions of a unified clock recovery procedure, as discussed below in conjunction with FIG. 5. In the FIG. 4 embodiment, clock manager 320 is disclosed and discussed as being implemented as a group of software modules that are executed by CPU 212 (FIG. 2). However, in alternate embodiments, various components and/or functionalities of clock manager 320 may readily be implemented as appropriate electronic hardware circuits that are configured for performing various functions that are equivalent to those functions discussed herein in conjunction with analog frontend module 412, digital frontend module 416, switch module 420, and backend clock recovery module 424.

Figure 5:
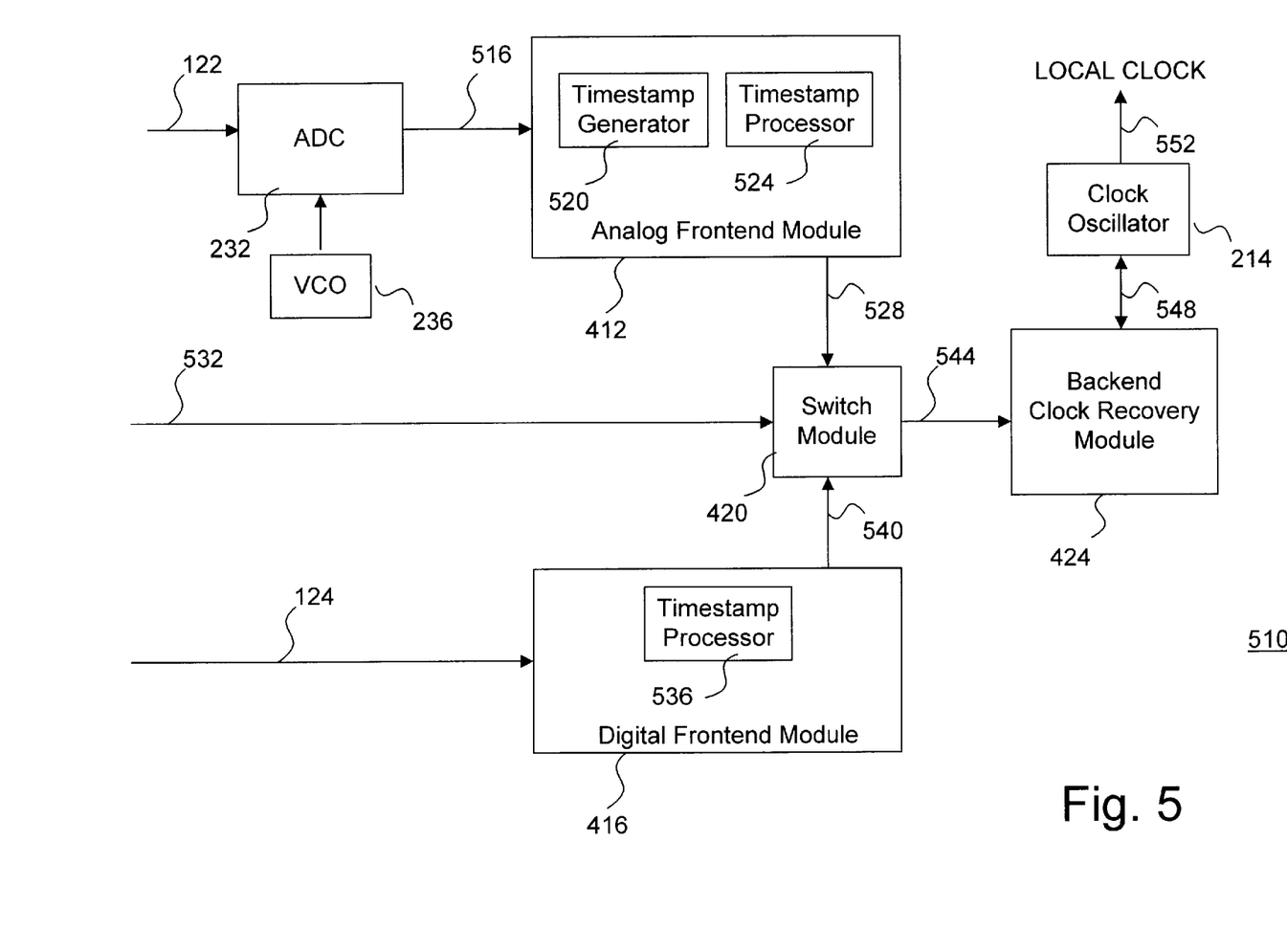
FIG. 5 is a block diagram for illustrating a unified clock recovery procedure, in accordance with one embodiment of the present invention.

Referring now to FIG. 5, a block diagram 510 illustrating a unified clock recovery procedure is shown, in accordance with one embodiment of the present invention. In alternate embodiments, the present invention may readily perform unified clock recovery procedures by utilizing various components, configurations, and techniques in addition to, or instead of, those discussed in conjunction with the FIG. 5 embodiment.

In the FIG. 5 embodiment, an analog video signal (such as an NTSC or PAL analog video signal) may be provided to ADC 232 from an analog transmitter 116 (FIG. 1) via path 122. ADC 232 may responsively convert the analog video signal into a converted digital signal that preferably retains timing relationships from the analog video signal. The converted digital signal may be formatted in any effective manner. For example, converted digital signal may be formatted according to a 656 digital bitstream standard. ADC 232 may preferably produce the converted analog signal by utilizing a sampling frequency provided from a voltage-controlled oscillator (VCO) 236. ADC 232 may then preferably provide the converted digital signal to analog frontend module 412 via path 516.

In the FIG. 5 embodiment, a timestamp generator 520 may then generate a series of analog-source timestamps 332 corresponding to the converted digital signal received from ADC 232. Timestamp generator 520 may repeatedly generate individual timestamps after a pre-defined acquisition unit of the converted digital signal has been received, starting with the beginning of an arbitrary line of video information in the converted digital signal. In the FIG. 5 embodiment, timestamp generator 520 may preferably utilize an acquisition unit that is equal to one video frame. However, in alternate embodiments, any other appropriate acquisition unit may be utilized. For example, timestamp generator 520 may utilize an acquisition unit that is equal to one video field, one video line, or one video pixel.

In the FIG. 5 embodiment, a timestamp processor 524 may then preferably store the analog-source timestamps 332 into memory 220 (FIG. 3) along with pointers to corresponding analog-source data 324. In certain embodiments, timestamp processor 524 may also perform various procedures with analog-source timestamps 332 to provide a processed output from analog frontend module 412 to backend clock recovery module 424 through switch module 420. For example, in certain embodiments, timestamp processor 524 may utilize analog-source timestamps 332 to calculate an input timing reference signal for use by backend clock recovery module 424.

In the FIG. 5 embodiment, a multiplexed bitstream (including a video bitstream) may similarly be provided to digital frontend module 416 from a digital transmitter 120 (FIG. 1) via path 124. The multiplexed bitstream (including a video stream) may be formatted in any effective manner. For example, the multiplexed bitstream (including the video bitstream) may be formatted according to a Motion Picture Experts Group (MPEG) standard. The foregoing digital bitstream may preferably include a series of digital-source timestamps 336 with timing information that corresponds to the digital bitstream.

In the FIG. 5 embodiment, a timestamp processor 536 may then preferably extract the digital-source timestamps 336, and store them into memory 220 (FIG. 3) along with pointers to corresponding digital-source data 328. In certain embodiments, timestamp processor 536 may also perform various procedures with digital-source timestamps 336 to provide a processed output from digital frontend module 416 to backend clock recovery module 424 through switch module 420. For example, in certain embodiments, timestamp processor 536 may utilize digital-source timestamps 336 to calculate an input timing reference signal for use by backend clock recovery module 424.

In the FIG. 5 embodiment, switch module 544 may preferably be controlled via path 532 to thereby select between either the processed output of analog frontend module 412 on path 528, or the processed output of digital frontend module 416 on path 540. In the FIG. 5 embodiment, switch module 420 may preferably be controlled in response to an input signal selection made by a system user of receiver 130 (FIG. 2). Switch module 544 may responsively provide the processed output of either analog frontend module 412 or digital frontend module 416 to backend clock recovery module 424 as an input timing reference signal via path 544.

In the FIG. 5 embodiment, backend clock recovery module 424 may preferably utilize the selected output of either analog frontend module 412 or digital frontend module 416 to control voltage-controlled clock oscillator 214 via path 548 to thereby generate a local clock on path 552. Backend clock recovery module 424 may be implemented in any effective manner. In certain embodiments, backend clock recovery module 424 may preferably generate an output timestamp every time an acquisition unit of video data is output from receiver 130. One embodiment for backend clock recovery module 424 is further discussed below in conjunction with FIG. 6.

In certain embodiments, timestamp processor 524 or backend clock recovery module 424 may calculate an input timing difference value by subtracting two sequential analog-source timestamps 332 to thereby define the input timing (period/frequency) of a corresponding acquisition unit. Alternately, timestamp processor 536 or backend clock recovery module 424 may calculate an input timing difference value by subtracting two sequential digital-source timestamps 336 to thereby define the input timing (period/frequency) of a corresponding acquisition unit.

Backend clock recovery module 424 may then calculate an output timing difference value by subtracting two appropriate sequential output timestamps to thereby define the output timing (period/frequency) of that same corresponding acquisition unit. Backend clock recovery module 424 may then subtract the foregoing input timing difference value from the corresponding output timing difference value to produce a timing error for adjusting voltage-controlled clock oscillator 214 to thereby control the timing of the local clock on path 552.

Figure 6:
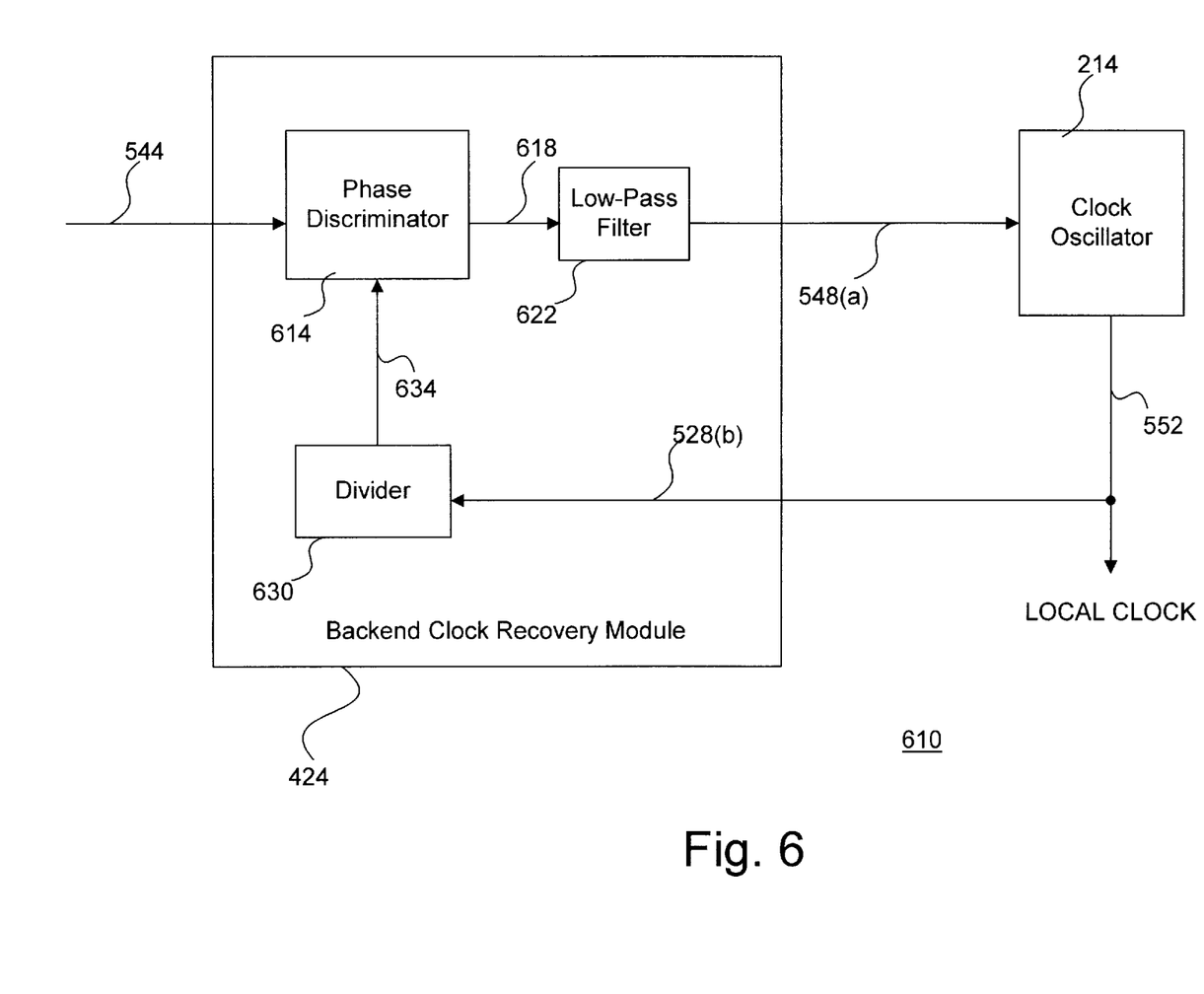
FIG. 6 is a block diagram for one embodiment of the backend clock recovery module of FIG. 5, in accordance with the present invention.

Referring now to FIG. 6, a block diagram for one embodiment of the FIG. 5 backend clock recovery module 424 is shown, in accordance with the present invention. In alternate embodiments, backend recovery module 424 may readily be implemented by utilizing various components, configurations, and techniques in addition to, or instead of, those discussed in conjunction with the FIG. 6 embodiment.

In the FIG. 6 embodiment, backend clock recovery module 424 may preferably receive an input timing reference signal from either analog frontend module 412 or digital frontend module 416 through switch module 420 (FIG. 5) via path 544, and may responsively provide the input timing reference signal to a first input of phase discriminator 614. As discussed above in conjunction with FIG. 5, frequency and phase characteristics of the input timing reference signal may preferably be derived by utilizing either analog-source timestamps 332 or digital-source timestamps 336.

Similarly, voltage-controlled clock oscillator 214 may preferably provide a local clock to a second input of phase discriminator 614 via path 552, path 528(b), divider 630, and path 634. Phase discriminator 614 may preferably compare the phase and frequency of any two input signals and responsively generates a corresponding timing error on path 618. In the FIG. 6 embodiment, the timing error from phase discriminator 514 may preferably be provided, via path 618, low-pass filter 622, and path 548(a), to voltage-controlled clock oscillator 214 to effectively control the phase and frequency of the local clock on path 522.

In certain embodiments, various other components may be included in backend clock recovery module 424. For example, voltage-controlled clock oscillator 548(a) may require a digital-to-analog converter (not shown) on path 548(a) to convert a digital timing error into an analog timing error for effectively controlling voltage-controlled clock oscillator 214. As discussed above, backend recovery module 424 may readily be implemented by utilizing various components, configurations, and techniques in addition to, or instead of, those discussed in conjunction with the FIG. 6 embodiment. For example, various components and/or functionalities of backend recovery module 424 may readily be implemented as appropriate electronic hardware circuits that are configured for performing various functions which are equivalent to those functions discussed herein in conjunction with a software-implementation of backend clock recovery module 424.

Figure 7:
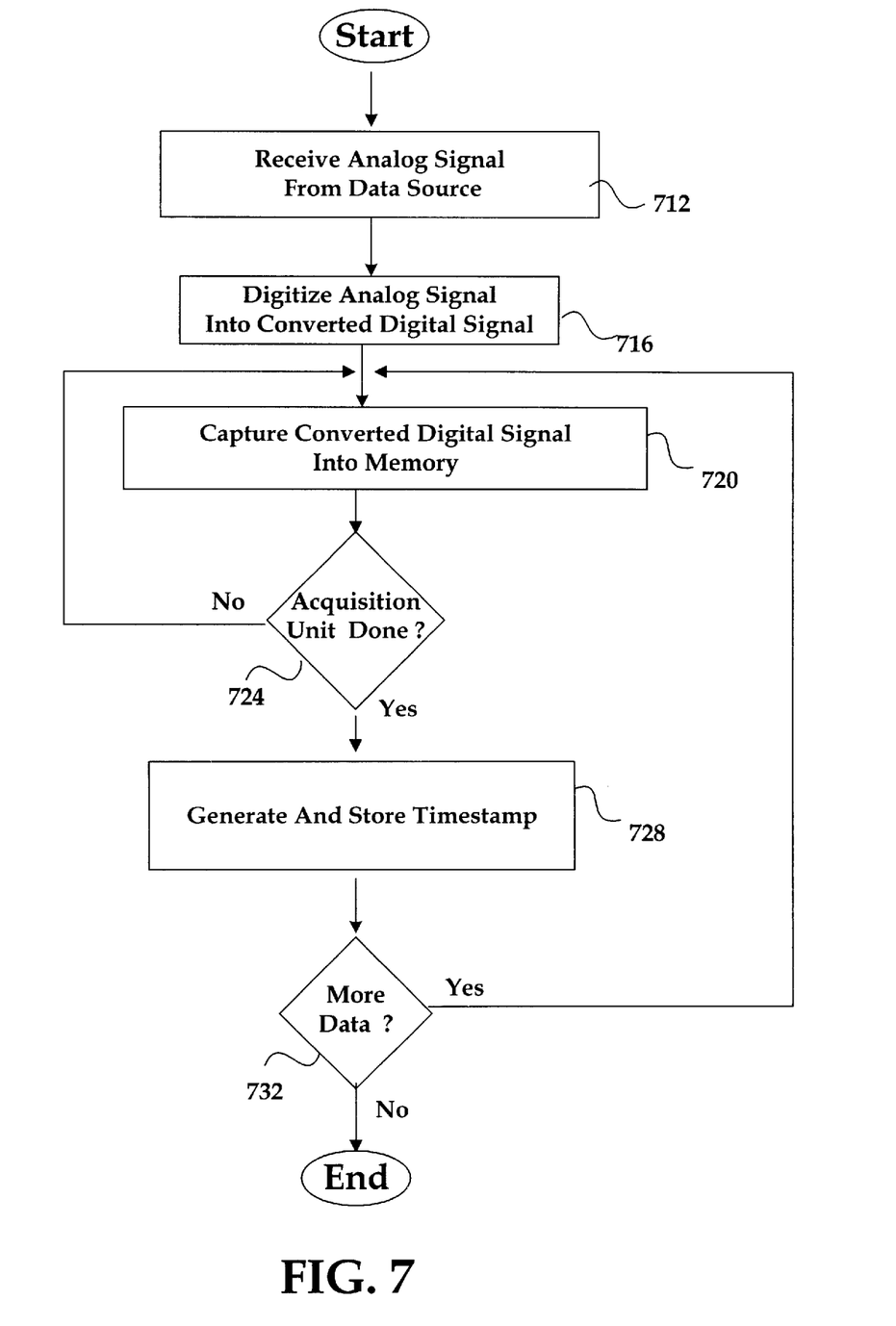
FIG. 7 is a flowchart of method steps for performing an analog frontend clock recovery procedure, in accordance with one embodiment of the present invention.

Referring now to FIG. 7, a flowchart of method steps for performing an analog frontend clock recovery procedure is shown, in accordance with one embodiment of the present invention. The FIG. 7 example is presented for purposes of illustration, and in alternate embodiments, the present invention may readily utilize various other steps and sequences than those discussed in conjunction with the FIG. 7 embodiment.

In the FIG. 7 embodiment, initially, in step 712, receiver 130 may preferably receive an analog signal from data source 114. Then, in step 716, an analog-to-digital converter (ADC) 232 may preferably digitize the received analog signal to produce a converted digital signal, as discussed above in conjunction with FIG. 5. In step 720, receiver 130 may preferably begin capturing the converted digital signal into memory 220 (FIG. 2) as analog-source data 324 (FIG. 3).

In step 724, analog frontend module 412 may preferably determine whether receiver 130 has captured a complete acquisition unit, as discussed above in conjunction with FIG. 5. If a complete acquisition unit has not been captured, then the FIG. 7 process preferably returns to step 720 to continue capturing the converted digital signal. However, if a complete acquisition unit has been captured, then in step 728, analog frontend module 412 may preferably generate and store a corresponding analog-source timestamp 332 into memory 220.

In step 732, receiver 130 determines whether there is more analog-source data 324 from data source 114. If receiver 130 determines that there is more analog-source data 324 from data source 114, then the FIG. 7 process may preferably return to step 720 to continue capturing the converted digital signal. However, if receiver 130 determines that there is no more analog-source data 324 from data source 114, then the FIG. 7 process may preferably terminate.

Figure 8:
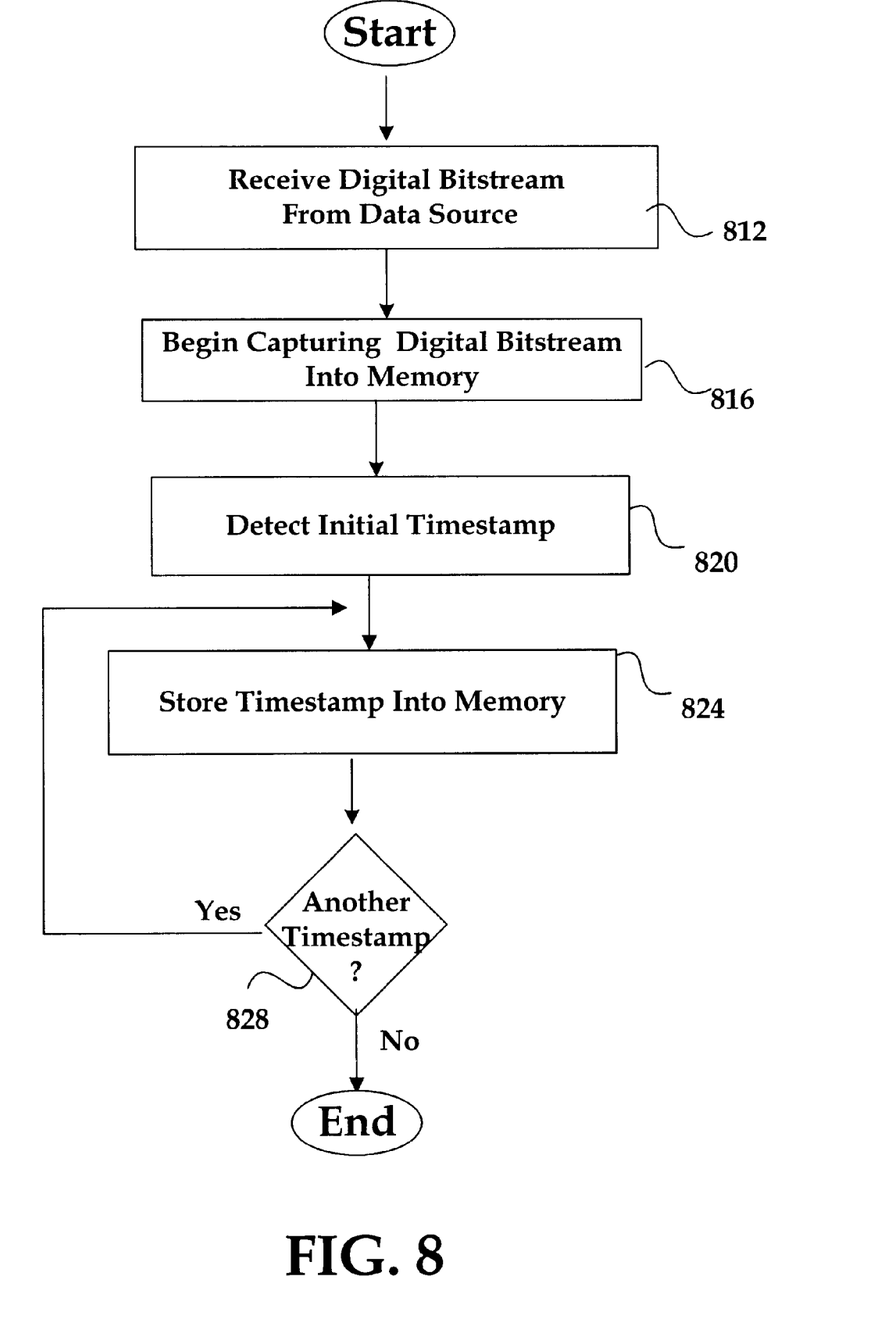
FIG. 8 is a flowchart of method steps for performing a digital frontend clock recovery procedure, in accordance with one embodiment of the present invention.

Referring now to FIG. 8, a flowchart of method steps for performing a digital frontend clock recovery procedure is shown, in accordance with one embodiment of the present invention. The FIG. 8 example is presented for purposes of illustration, and in alternate embodiments, the present invention may readily utilize various other steps and sequences than those discussed in conjunction with the FIG. 8 embodiment.

In the FIG. 8 embodiment, initially, in step 812, receiver 130 may preferably receive a digital bitstream from data source 114. Then, in step 816, receiver 130 may preferably begin capturing the digital bitstream into memory 220 (FIG. 2) as digital-source data 328 (FIG. 3). In step 820, digital frontend module 416 may preferably detect an initial digital-source timestamp 336 in the received digital bitstream. Then, in step 824, digital frontend module 416 may preferably extract and store the detected digital-source timestamp 332 into memory 220.

In step 828, receiver 130 determines whether there is another digital-source timestamp 336 in the digital bitstream. If receiver 130 determines that there are other digital-source timestamps 336 in the digital bitstream, then the FIG. 8 process may preferably return to step 824 to continue extracting and storing the digital-source timestamps 336 into memory 220. However, if receiver 130 determines that there are no more digital-source timestamps 336, then the FIG. 8 process may preferably terminate.

Figure 9:
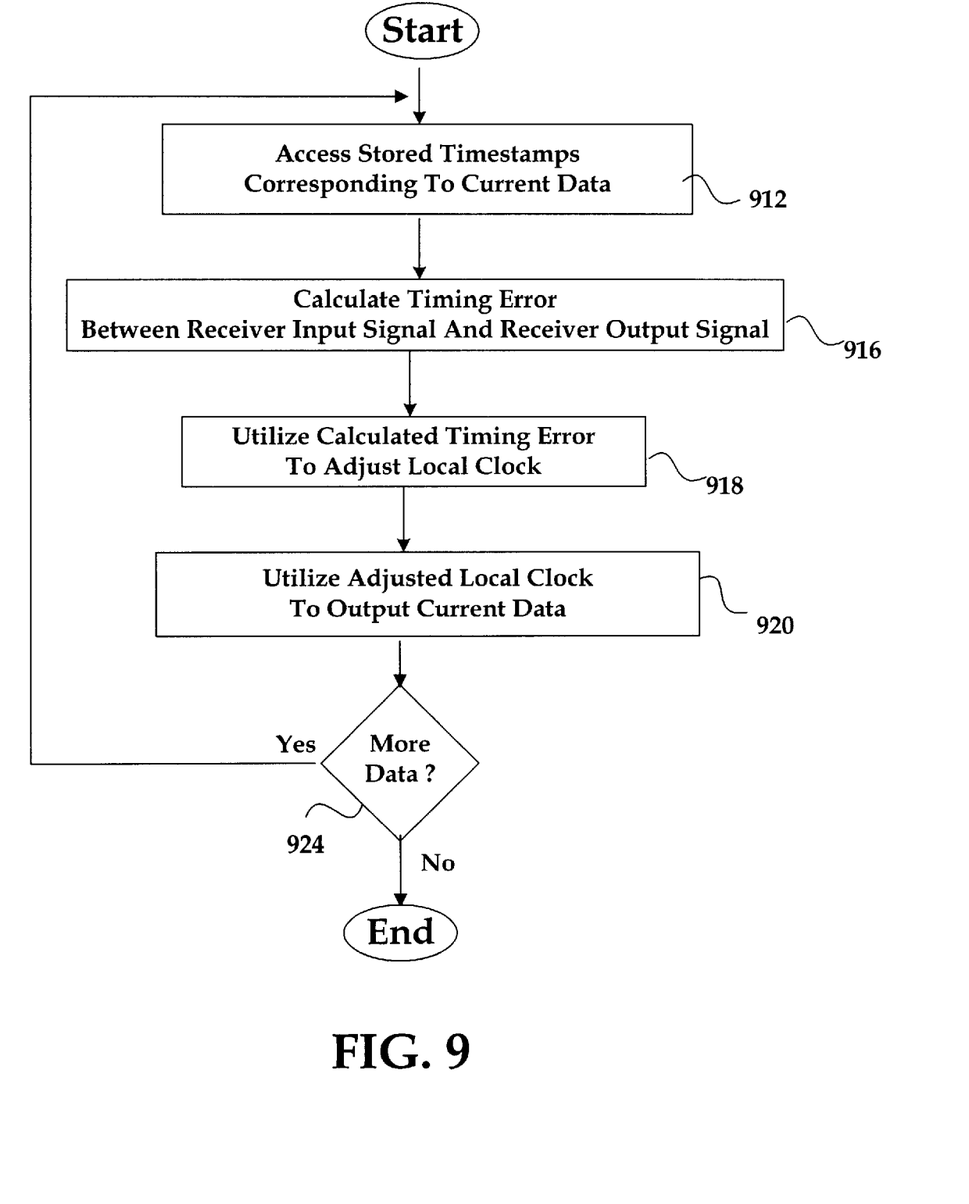
FIG. 9 is a flowchart of method steps for performing a unified backend clock recovery procedure, in accordance with one embodiment of the present invention.

Referring now to FIG. 9, a flowchart of method steps for performing a unified backend clock recovery procedure is shown, in accordance with one embodiment of the present invention. The FIG. 9 example is presented for purposes of illustration, and in alternate embodiments, the present invention may readily utilize various other steps and sequences than those discussed in conjunction with the FIG. 9 embodiment.

In the FIG. 9 embodiment, initially, in step 912, backend clock recovery module 424 may preferably access appropriate stored timestamps (either analog-source timestamps 332 or digital-source timestamps 336) depending upon the position of switch module 420, as discussed above in conjunction with FIG. 5.

In step 916, backend clock recovery module 424 (or other appropriate entity) may next preferably calculate a timing error between an input video signal of receiver 130 and a corresponding output video signal of receiver 130, as discussed above in conjunction with FIG. 5. Then, in step 918, backend clock recovery module 424 may utilize the calculated timing error to adjust a local clock of receiver 130.

In step 920, receiver 130 may then advantageously utilize the adjusted local clock to synchronize and output current data to an appropriate output device, such as display 216 (FIG. 2). In step 924, receiver 130 may preferably determine whether there is more analog-source data 324 or digital-source data 328 from data source 114 to output to the foregoing output device. If receiver 130 determines that there is more analog-source data 324 or digital-source data 328 to output, then the FIG. 9 process may preferably return to step 912 to continue performing the unified backend clock recovery procedure. However, if receiver 130 determines that there is no more analog-source data 324 or digital-source data 328 to output, then the FIG. 9 process may preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a unified clock recovery procedure, comprising:

an analog frontend module configured to generate an analog-source reference signal based upon analog-source data;

a digital frontend module configured to generate a digital-source reference signal based upon digital-source data;

a switch module coupled to said analog frontend module and said digital frontend module for selecting between one of said analog-source reference signal and said digital-source reference signal to thereby produce a selected input reference signal; and a backend clock recovery module configured to compare said selected input reference signal with an output reference signal in order to generate a timing error, said backend clock recovery module then responsively adjusting a local clock to compensate for said timing error.

2. The system of claim 1 wherein said analog-source data includes video data that is formatted in accordance with an NTSC standard, and wherein said digital-source data includes a video bitstream that is formatted in accordance with an MPEG standard.

3. The system of claim 1 wherein said analog frontend module, said digital frontend module, said switch module, and said backend clock recovery module are implemented as part of a receiver device that receives said analog-source data from an analog transmitter device, and that similarly receives said digital-source data from a digital transmitter device.

4. The system of claim 3 wherein an analog-to-digital converter converts said analog-source data into converted digital data that retains timing relationships of said analog-source data, said analog frontend module responsively storing said converted digital data into a local memory.

5. The system of claim 4 wherein a timestamp generator from said analog frontend module generates a series of analog-source timestamps corresponding to said converted digital data.

6. The system of claim 5 wherein said timestamp generator repeatedly generates a new analog-source timestamp from said series of analog-source timestamps each time an acquisition unit of said converted digital data has been stored into said local memory.

7. The system of claim 6 wherein said acquisition unit is selected to be a pre-determined size that begins at a starting point of an arbitrary line of video information in said converted digital data, said pre-determined size being at least one of a video frame, a video field, a video line, and a video pixel.

8. The system of claim 5 wherein a timestamp processor from said analog frontend module processes and stores said analog-source timestamps into a local memory.

9. The system of claim 3 wherein a timestamp processor from said digital frontend module extracts a series of digital-source timestamps from said digital-source data, said timestamp processor then storing said digital-source timestamps into a local memory.

10. The system of claim 3 wherein said switch module selects between one of said analog-source reference signal and said digital-source reference signal in response to a program selection from a system user.

11. The system of claim 3 wherein said backend clock recovery module provides said timing error to a controllable clock oscillator to thereby adjust said local clock.

12. The system of claim 11 wherein said backend clock recovery module is implemented as a phase-locked loop for controlling said clock oscillator to produce said local clock.

13. The system of claim 12 wherein said phase-locked loop includes a phase discriminator that receives said input reference signal at a first input, said phase discriminator receiving said local clock from said clock oscillator at a second input, said phase discriminator responsively generating said timing error through a low-pass filter to control said clock oscillator.

14. The system of claim 11 wherein said backend clock recovery module calculates an input timing difference value by subtracting either two sequential analog-source timestamps or two sequential digital-source timestamps, depending on an input signal selection of said switch module.

15. The system of claim 14 wherein said backend clock recovery module generates a series of output timestamps, said backend clock recovery module then calculating an output timing difference value by subtracting two of said series of output timestamps that correspond to said input timing difference value.

16. The system of claim 15 wherein said backend clock recovery module subtracts said input timing difference value from said output timing difference value to produce said timing error for adjusting said clock oscillator to thereby control said local clock.

17. The system of claim 11 wherein said timing error is converted by a digital-to-analog converter before being applied to said clock oscillator.

18. The system of claim 11 wherein said backend clock recovery module utilizes said timing error for controlling said local clock to thereby match an average output timing rate of said receiver to an average input timing rate of said receiver.

19. The system of claim 18 wherein said receiver utilizes said local clock to synchronize selectively outputting one of said analog-source data and said digital-source data to an output device.

20. The system of claim 1 wherein selected portions of at least one of said analog frontend module, said digital frontend module, said switch module, and said backend clock recovery module are implemented to include at least one of electronic circuitry and software instructions.

21. A method for performing a unified clock recovery procedure, comprising the steps of:
generating an analog-source reference signal based upon analog-source data by utilizing an analog frontend module;
generating a digital-source reference signal based upon digital-source data by utilizing a digital frontend module;
selecting between one of said analog-source reference signal and said digital-source reference signal with a switch module to thereby produce a selected input reference signal;
utilizing a backend clock recovery module to compare said selected input reference signal with an output reference signal in order to generate a timing error; and
adjusting a local clock with said backend clock recovery module to thereby compensate for said timing error.

22. The method of claim 21 wherein said analog-source data includes video data that is formatted in accordance with an NTSC standard, and wherein said digital-source data includes a video bitstream that is formatted in accordance with an MPEG standard.

23. The method of claim 21 wherein said analog frontend module, said digital frontend module, said switch module, and said backend clock recovery module are implemented as part of a receiver device that receives said analog-source data from an analog transmitter device, and that similarly receives said digital-source data from a digital transmitter device.

24. The method of claim 23 wherein an analog-to-digital converter converts said analog-source data into converted digital data that retains timing relationships of said analog-source data, said analog frontend module responsively storing said converted digital data into a local memory.

25. The method of claim 24 wherein a timestamp generator from said analog frontend module generates a series of analog-source timestamps corresponding to said converted digital data.

26. The method of claim 25 wherein said timestamp generator repeatedly generates a new analog-source timestamp from said series of analog-source timestamps each time an acquisition unit of said converted digital data has been stored into said local memory.

27. The method of claim 26 wherein said acquisition unit is selected to be a pre-determined size that begins at a starting point of an arbitrary line of video information in said converted digital data, said pre-determined size being at least one of a video frame, a video field, a video line, and a video pixel.

28. The method of claim 25 wherein a timestamp processor from said analog frontend module processes and stores said analog-source timestamps into a local memory.

29. The method of claim 23 wherein a timestamp processor from said digital frontend module extracts a series of digital-source timestamps from said digital-source data, said timestamp processor then storing said digital-source timestamps into a local memory.

30. The method of claim 23 wherein said switch module selects between one of said analog-source reference signal and said digital-source reference signal in response to a program selection from a system user.

31. The method of claim 23 wherein said backend clock recovery module provides said timing error to a controllable clock oscillator to thereby adjust said local clock.

32. The method of claim 31 wherein said backend clock recovery module is implemented as a phase-locked loop for controlling said clock oscillator to produce said local clock.

33. The method of claim 32 wherein said phase-locked loop includes a phase discriminator that receives said input reference signal at a first input, said phase discriminator receiving said local clock from said clock oscillator at a second input, said phase discriminator responsively generating said timing error through a low-pass filter to control said clock oscillator.

34. The method of claim 31 wherein said backend clock recovery module calculates an input timing difference value by subtracting either two sequential analog-source timestamps or two sequential digital-source timestamps, depending on an input signal selection of said switch module.

35. The method of claim 34 wherein said backend clock recovery module generates a series of output timestamps, said backend clock recovery module then calculating an output timing difference value by subtracting two of said series of output timestamps that correspond to said input timing difference value.

36. The method of claim 35 wherein said backend clock recovery module subtracts said input timing difference value from said output timing difference value to produce said timing error for adjusting said clock oscillator to thereby control said local clock.

37. The method of claim 31 wherein said timing error is converted by a digital-to-analog converter before being applied to said clock oscillator.

38. The method of claim 31 wherein said backend clock recovery module utilizes said timing error for controlling said local clock to thereby match an average output timing rate of said receiver to an average input timing rate of said receiver.

39. The method of claim 38 wherein said receiver utilizes said local clock to synchronize selectively outputting one of said analog-source data and said digital-source data to an output device.

40. The method of claim 21 wherein selected portions of at least one of said analog frontend module, said digital frontend module, said switch module, and said backend clock recovery module are implemented to include at least one of electronic circuitry and software instructions.

41. A computer-readable medium comprising program instructions for performing a unified clock recovery procedure by performing the steps of:

generating an analog-source reference signal based upon analog-source data by utilizing an analog frontend module;

generating a digital-source reference signal based upon digital-source data by utilizing a digital frontend module;

selecting between one of said analog-source reference signal and said digital-source reference signal with a switch module to thereby produce a selected input reference signal;

utilizing a backend clock recovery module to compare said selected input reference signal with an output reference signal in order to generate a timing error; and adjusting a local clock with said backend clock recovery module to thereby compensate for said timing error.

42. A system for performing a unified clock recovery procedure, comprising:

means for generating an analog-source reference signal based upon analog-source data;

means for generating a digital-source reference signal based upon digital-source data;

means for selecting between one of said analog-source reference signal and said digital-source reference signal to thereby produce a selected input reference signal;

means for comparing said selected input reference signal with an output reference signal in order to generate a timing error; and means for adjusting a local clock to compensate for said timing error.

43. A system for performing a unified clock recovery procedure, comprising:

an analog frontend module configured to generate an analog-source reference signal;

a digital frontend module configured to generate a digital-source reference signal;

a switch module for selecting between said analog-source reference signal and said digital-source reference signal to thereby produce a selected input reference signal; and a backend clock recovery module configured to utilize said selected input reference signal for determining an output timing error, said backend clock recovery module then adjusting a local clock to compensate for said output timing error.

* * * * *